(12) United States Patent
Bauer et al.

(10) Patent No.: US 6,649,709 B1
(45) Date of Patent: Nov. 18, 2003

(54) GAS PHASE FLUIDIZED BED METHOD AND ETHYLENE HOMO- AND COPOLYMERS OBTAINED USING SAID METHOD

(75) Inventors: Peter Bauer, Ludwigshafen (DE); Armin Lange, Heidelberg (DE); Rainer Karer, Kaiserslautern (DE); Philipp Rosendorfer, Neustadt (DE); Manfred Hecker, Neustadt (DE); Günther Schweier, Friedelsheim (DE); Wolfgang Micklitz, Neustadt (DE); Kaspar Evertz, Schifferstadt (DE); Hans-Jacob Feindt, Limburgerhof (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/555,594

(22) PCT Filed: Dec. 26, 1998

(86) PCT No.: PCT/EP98/07638
§ 371 (c)(1),
(2), (4) Date: May 31, 2000

(87) PCT Pub. No.: WO99/29736
PCT Pub. Date: Jun. 17, 1999

(30) Foreign Application Priority Data

Dec. 9, 1997 (DE) ........................... 197 54 380

(51) Int. Cl.⁷ .................................. C08F 2/34
(52) U.S. Cl. .................. 526/88; 526/105; 526/106; 526/348.2; 526/348.5; 526/348.6
(58) Field of Search ............... 526/348.2, 348.5, 526/348.6, 105, 106

(56) References Cited

U.S. PATENT DOCUMENTS

| | | | | |
|---|---|---|---|---|
| 4,587,227 A | * | 5/1986 | Smith et al. | 502/153 |
| 5,137,994 A | | 8/1992 | Goode et al. | |
| 5,324,697 A | * | 6/1994 | Mueller et al. | 502/150 |
| 5,648,439 A | | 7/1997 | Bergmeister et al. | |

FOREIGN PATENT DOCUMENTS

| | | |
|---|---|---|
| EP | 004 645 | 7/1979 |
| EP | 089 691 | 9/1983 |
| EP | 120 503 | 10/1984 |
| EP | 174 507 | 3/1986 |
| EP | 175 532 | 3/1986 |
| EP | 241 947 | 10/1987 |
| EP | 475 603 | 3/1992 |
| EP | 0571 826 | * 5/1993 |
| EP | 571 826 | 12/1993 |
| EP | 849 293 | 6/1998 |
| WO | 95/33778 | 12/1995 |

OTHER PUBLICATIONS

J.Poly Sci, Apr. 1983, vol. 21, No. 4, 1217–1221.

* cited by examiner

Primary Examiner—David W. Wu
Assistant Examiner—William Cheung
(74) Attorney, Agent, or Firm—Keil & Weinkauf

(57) ABSTRACT

A continuous vapor-phase fluidized-bed process for the preparation of ethylene homopolymers and copolymers having a density of from 0.87 to 0.97 g/cm³ in which ethylene or mixtures of ethylene and $C_3$–$C_8$ a-monoolefins are (co)polymerized in the presence of a supported chromium catalyst in the polymerization zone of a vapor-phase fluidized-bed reactor under pressures ranging from 1 to 100 bar and at temperatures ranging from 30° to 125° C. in the vapor phase in an agitated bed of bulk material comprising particulate polymer, the resultant heat of polymerization is removed by cooling the recirculated reactor gas and the resulting (co)polymer is removed from the vapor-phase fluidized-bed reactor, wherein, for the preparation of a (co)polymer of a specific density d, the (co)polymerization is carried out at a temperature which is in a range restricted by an upper envelope defined by equation I $$T_H = 171 + \frac{6d'}{0.84 - d'} \quad \text{(I)}$$

and a lower envelope defined by equation II $$T_L = 173 + \frac{7.3d'}{0.837 - d'}, \quad \text{(II)}$$

in which the variables have the following meanings:
  $T_H$ is the highest reaction temperature in ° C.;
  $T_L$ is the lowest reaction temperature in ° C.;
  d' is the numerical value of the density d of the (co)polymer to be synthesized.

16 Claims, No Drawings

GAS PHASE FLUIDIZED BED METHOD AND ETHYLENE HOMO- AND COPOLYMERS OBTAINED USING SAID METHOD

DESCRIPTION

The present invention relates to a continuous vapor-phase fluidized-bed process for the preparation of ethylene homopolymers and copolymers having a density of from 0.87 to 0.97 g/cm$^3$ in which ethylene or mixtures of ethylene and $C_3$–$C_8$ α-monoolefins are (co)polymerized in the presence of a supported chromium catalyst in the polymerization zone of a vapor-phase fluidized-bed reactor under pressures ranging from 1 to 100 bar and at temperatures ranging from 30° to 125° C. in the vapor phase in an agitated bed of bulk material comprising particulate polymer, the resultant heat of polymerization is removed by cooling the recirculated reactor gas and the resulting (co)polymer is removed from the vapor-phase fluidized-bed reactor.

The present invention also relates to ethylene homopolymers and copolymers produced by this process, to the use of such ethylene copolymers for the preparation of films and to films produced using these ethylene copolymers.

The properties of ethylene homopolymers and copolymers concerning the processibility and mechanical stability thereof are substantially governed by the density thereof, the average molar mass thereof, the molecular mass distribution thereof, the nature of the comonomer and the distribution of comonomer in terms of molar mass. These properties are correlated in a complex manner with the manufacturing conditions of the homopolymers and copolymers and can be influenced both by physical process parameters such as pressure and temperature and by the choice of certain catalysts.

A parameter that is of particular significance for the processibility of ethylene homopolymers and copolymers is the meltflow rate. In addition to the nature and distribution of the comonomer, another factor primarily governing the melt flow rate is the average molar mass of the polymer.

Processes for the preparation of ethylene copolymers in vapor-phase fluidized beds using supported chromium catalysts are revealed in EP-A-1-0175532 and EP-A-1-0475603, for example. In order to avoid coagulation of particles of polymer these polymerization processes are carried out at various temperatures depending on the density and thus on the softening temperature of the polymer but always at temperatures well below the softening temperature.

EP-B-0571826 describes a continuous vapor-phase fluidized-bed process for the preparation of ethylene homopolymers and copolymers which is carried out at temperatures only slightly below the softening temperature of the particles of polymer. The catalyst used is in this case a Ziegler's catalyst containing titanium and magnesium.

The polymers prepared by the known vapor-phase fluidized-bed processes are still unsatisfactory as regards processibility.

It was thus the object of the present invention to provide a process for the preparation of ethylene homopolymers and copolymers using a supported chromium catalyst giving products having improved processing properties.

Accordingly, there has been found a continuous vapor-phase fluidized-bed process for the preparation of ethylene homopolymers and copolymers having a density d of from 0.87 to 0.97 g/cm$^3$, in which ethylene or mixtures of ethylene and $C_3$–$C_8$ α-monoolefins are (co)polymerized in the presence of a supported chromium catalyst in the polymerization zone of a vapor-phase fluidized-bed reactor under pressures ranging from 1 to 100 bar and at temperatures ranging from 30° to 125° C. in the vapor phase in an agitated bed of bulk material comprising particulate polymer, the resultant heat of polymerization is removed by cooling the recirculated reactor gas and the resulting (co)polymer is removed from the vapor-phase fluidized-bed reactor, wherein, for the preparation of a (co)polymer of a specific density d, the (co)polymerization is carried out at a temperature in a range which is restricted by an upper envelope define by equation I $$T_H = 171 + \frac{6d'}{0.84 - d'} \qquad (I)$$

and a lower envelope defined by equation II $$T_L = 173 + \frac{7.3d'}{0.837 - d'}, \qquad (II)$$

in which the variables have the following meanings:
  $T_H$ is the highest reaction temperature in ° C.;
  $T_L$ is the lowest reaction temperature in ° C.;
  d' is the numerical value of the density d of the (co)polymer to be synthesized.

There have also been found novel ethylene homopolymers and copolymers which have improved properties and can be produced by this process, the use of such ethylene copolymers for the preparation of films, and also films prepared from these ethylene copolymers.

An essential feature of the process of the invention is the combination of a high polymerization temperature with a specific catalyst, namely a supported chromium catalyst. Both factors are known to have an influence on the properties of the polymers to be synthesized. Thus high reactor temperatures have a preferential influence on the chain terminating reaction as against chain growth. The higher the reactor temperature, the lower the average molar mass $M_W$ and, consequently, the higher the melt flow rate. However, upper limits are set to the reactor temperature by the softening temperature of the polymer that is formed.

On the other hand, the catalyst also has a strong influence on the properties of the polymers to be synthesized. Thus in the case of chromium catalysts there is a marked correlation between the porosity of the support and the average molar mass of the polymer produced. The greater the pore volume of the support, the lower the average molar mass $M_W$ and consequently the higher the melt flow rate (M-P. McDaniel, J. Polym. Sci., Polym. Chem. E. 21, 1217 (1983)).

Even the temperature at which a chromium catalyst is activated influences the properties of the polymers. Below the sintering temperature of the support material used the following association is true: the higher the activating temperature of the chromium catalyst, the lower the average molar mass $M_W$ and consequently the higher the melt flow rate of the polymer produced.

It has now been found, surprisingly, that polymers which scarcely differ from conventional polymers as regards the comonomer configuration thereof, the density thereof and the melt flow indices thereof but which have been polymerized at a higher temperature, show different processing properties and in this respect are superior to the conventional polymers, in some cases distinctly so.

For the process of the invention to be efficacious it is important, when preparing a (co)polymer of a specific density d, to carry out (co)polymerization at a temperature T in a range restricted by the upper envelope defined by the above equation I and the lower envelope defined by the above equation II. This means that temperatures T which are outside this range may not be used during the process of the invention, as the process will not otherwise be successful. In other words, equations I and II indicate the highest reaction temperature $T_H$ and the lowest reaction temperature $T_L$ at which a (co)polymer having a certain desired density d can just be prepared using the process of the invention.

The process of the invention is carried out in a vapor-phase fluidized-bed reactor, as described in detail in, for example, EP-A 0,004,645, EP-A 0,089,691, EP-A 0,120,503 or EP-A 0,241,947. The vapor-phase fluidized-bed reactor is generally a more or less long tube through which there flows recirculated reactor gas. The recirculated reactor gas is generally fed to the lower end of the vapor-phase fluidized-bed reactor and is withdrawn at the upper end thereof. The recirculated reactor gas is usually a mixture of ethylene, if desired a molecular weight modifier such as hydrogen, and inert gases such as nitrogen and/or saturated hydrocarbons such as methane, butane or hexane. Furthermore, the reactor gas can contain $C_3$–$C_8$ α-monoolefins such as propylene, but-1-ene, pent-1-ene, hex-1-ene, hept-1-ene and oct-1-ene. Preference is given to a process in which ethylene is copolymerized with 1-hexene. The velocity of the reactor gas, measured as void tube velocity, must be sufficiently high in order, on the one hand, to fluidize the agitated bed of particulate polymer located in the tube and serving as polymerization zone and, on the other hand, to remove the heat of polymerization in an effective manner.

In order to maintain constant reaction conditions, the components of the reactor gas can be fed to the vapor-phase fluidized-bed reactor either directly or via the recirculated reactor gas. It is generally found to be advantageous to introduce the aforementioned $C_3$–$C_8$ α-monoolefins directly into the vapor-phase fluidized-bed reactor. Furthermore, it is of advantage to the process of the invention when the supported chromium catalyst is directly introduced into the agitated bed of particulate polymer. It has been found to be particularly advantageous to meter the catalyst by the method described in DE-A-3,544,915 portion wise together with nitrogen or argon directly into the bed of bulk material.

In order to avoid entrapment of particulate polymer from the polymerization zone into the gas system, the vapor-phase fluidized-bed reactor used for the process of the invention exhibits, at the top, a steadying zone of greater diameter, which reduces the velocity of the recycled gas. It is generally recommendable to reduce the velocity of the recycled gas in this steadying zone to one third to one sixth of the velocity of the recirculated gas in the polymerization zone.

Following its emergence from the vapor-phase fluidized-bed reactor, the recirculated reactor gas is fed to a gas compressor and a gas condenser. Afterwards, the cooled and compressed recycled gas is re-introduced into the agitated bed of bulk material of the vapor-phase fluidized-bed reactor via a conventional gas distributor plate as commonly used. The result is an extremely homogeneous distribution of the vapor phase, which ensures thorough mixing of the bed of bulk material.

Also, in the process of the invention, the proportions of the starting products, and particularly the ratio of ethylene to $C_3$–$C_8$ α-monoolefins, determine the density d of the resulting copolymer.

Furthermore, the amount of catalyst metered in determines the output of the vapor-phase fluidized-bed reactor. The capacity thereof is, as is well known, restricted by the cooling capacity of the recirculated reactor gas. This cooling capacity is governed on the one hand by the pressure which is exerted on the reactor gas or at which the (co)polymerization is carried out. In this case it is generally recommendable too operate under pressures of from 1 to 100, preferably from 10 to 80 bar and more preferably from 15 to 50 bar. On the other hand, the cooling capacity is governed by the temperature at which the (co)polymerization is carried out in the agitated bed of particulate polymer. It is advantageous to operate the process of the invention at temperatures ranging from 30° to 125° C., where the stated temperature/density correlations are to be observed as upper and lower limits respectively.

It has been found to be particularly advantageous to use a process in which the temperature is set in relation to the density such that the lower envelope of the temperature/density function is given by the equation II'

$$T_L = 175 + \frac{7.3d'}{0.837 - d'} \qquad (II')$$

Not only the temperature, but also the content of inert gases such as nitrogen or hydrocarbons has an influence on the risk of coagulation and sedimentation. High inert gas concentrations do reduce the risk of sedimentation but at the same time they lower the space-time yield, so that the process may become uneconomical. In the process of the invention, the inert gas concentration is preferably from 25 to 55 vol % and more preferably from 35 to 50 vol %, based on the total volume of the reaction gas.

The (co)polymer produced by the process of the invention can be removed from the vapor-phase fluidized-bed reactor in conventional manner. Due to the special advantages of the process of the invention and the products thus produced, this removal may be effected by simply opening a ball stop-cock in an outlet pipe leading to a let-down tank. In this case the pressure in the let-down tank is kept as low as possible to enable transport to be effected over longer distances and in order to free the (co)polymers from adsorbed liquids such as residual monomers during this removal stage. Then, in the let-down tank, the (co)polymers can be purified further by purging with ethylene for example. The residual monomers that are thus desorbed and the ethylene that is introduced as purging medium can be fed to a conventional condensing step, in which they are separated from each other—advantageously under standard pressure and at lower temperatures. The liquid residual monomers are generally fed directly back to the bed of bulk material, but the ethylene used for purging and any gases that are still present can be compressed in a conventional compressor for recirculated gases and then returned to the recirculated reactor gas.

The (co)polymers that are present in the let-down tank can be further transported to a deodorizing or deactivating tank, in which they can be subjected to conventional treatment with nitrogen and/or steam.

Apart from controlling the reaction, the catalyst also has an important influence on the polymer properties. Generally, all supported chromium catalysts can be used in the process of the invention. Many of these chromium catalysts, also referred to as Phillip's catalysts, have been known for many years.

Particularly suitable support materials are inorganic compounds, especially porous oxides such as $SiO_2$, $Al_2O_3$, $MgO$, $ZrO_2$, $B_2O_3$, $CaO$, $ZnO$ or mixtures of these oxides. The support materials preferably exhibit a particle size between 1 and 300 μm, particularly from 30 to 70 μm. Examples of particularly preferred supports are silica gels and alumosilicate gels, preferably those of the formula $SiO_2 \cdot aAl_2O_3$, in which a stands for a number ranging from 0 to 2, preferably from 0 to 0.5; these are thus alumosilicates or silicon dioxide. Such products are commercially available, for example as Silica Gel 332 sold by Grace.

Preferred catalysts are based on a support material having a pore volume of from 1.0 to 3.0 mL/g, preferably from 1.6 to 2.2 mL/g and more preferably from 1.7 to 1.9 mL/g and a surface area (BET) of from 200 to 500 $m^2/g$ and preferably from 300 to 400 $m^2/g$.

Doping of the catalyst support with the active component containing chromium preferably takes place from a solution or, in the case of volatile compounds, from the vapor phase. Suitable chromium compounds are chromium(VI) oxide, chromium salts such as chromium(III) nitrate and chromium (III) acetate, complex compounds such as chromium(III) acetylacetonate or chromium hexacarbonyl, or alternatively organometallic compounds of chromium such as bis (cyclopentadienyl)chromium(II), organic chromic esters or bis(aren)chromium(0). Cr(III) nitrate is preferably used.

The support is generally loaded by contacting the support material, in a solvent, with a chromium compound, removing the solvent and calcining the catalyst at a temperature of from 400° to 1100° C. The support material can for this purpose be suspended in a solvent or in a solution of the chromium compound.

In addition to the chromiferous active component, other doping substances can be applied to the support system. Examples of suitable such doping substances are compounds of boron, fluorine, aluminum, silicon, phosphorus and titanium. These doping substances are preferably applied to the support together with the chromium compounds but can alternatively be applied to the support in a separate step before or after the application of chromium.

Examples of solvents suitable for use when doping the support are water, alcohols, ketones, ethers, esters and hydrocarbons, methanol being particularly suitable.

The concentration of the doping solution is generally from 0.1 to 200, preferably from 1 to 50, grams of chromium compound per liter of solvent.

The ratio by weight of chromium compounds to the support during application is generally from 0.001:1 to 200:1, preferably from 0.005:1 to 100:1.

According to one embodiment of the process of the invention, the chromium catalyst is prepared by adding small amounts of MgO and/or ZnO to the inactive pre-catalyst and subsequently activating this mixture in conventional manner. This measure improves the electrostatic properties of the catalyst.

For activation, the dry pre-catalyst is calcined at temperatures between 400° and 1100° C. for example in a fluidized-bed reactor in an oxidizing atmosphere containing oxygen. Cooling preferably takes place under an inert gas atmosphere in order to prevent adsorption of oxygen. It is also possible to carry out this calcination in the presence of fluorine compounds, such as ammonium hexafluorosilicate, by which means the catalyst surface is modified with fluorine atoms.

Calcination of the pre-stage preferably takes place in a vapor-phase fluidized bed. According to one preferred embodiment, the mixture is first heated to from 200° to 400° C. (preferably to from 250° to 350° C.) with fluidization thereof by pure inert gas (preferably nitrogen), which is subsequently replaced by air, whereupon the mixture is heated to the desired end temperature. The mixture is kept at the end temperature for a period of from 2 to 20 hours and preferably from 5 to 15 hours, after which the flow of gas is switched back to inert gas, and the mixture is cooled.

According to a preferred embodiment of the process of the invention, a supported chromium catalyst is used which has been activated at a temperature of from 600° to 800° C., more preferably at a temperature between 650° and 750° C.

Some of the ethylene homopolymers and copolymers produced by the process of the invention have noteworthy properties. These properties are particularly noticeable in the case of ethylene copolymers having a density of from 0.930 to 0.945, for which reason these ethylene copolymers are preferred. Ethylene copolymers having a density between 0.935 and 0.940 are particularly preferred. The particularly preferred polymerizing temperature range for ethylene copolymers of this density range is that between 110° and 113° C.

Careful balancing of polymerization temperature and catalyst, and also, in particular, of pore volume of the support and activating temperature, makes it possible to provide products having various melt flow indices (MFI) and melt flow rates (MFR), if desired for a given comonomer concentration and thus a given density. For the preparation of films, those copolymers have proven to be particularly advantageous which exhibit a melt flow rate of from 8 to 16, preferably from 10 to 14 (measured as specified by ISO 1133; 21.6/190° C.).

The ethylene copolymers produced by the process of the invention, particularly those showing the aforementioned preferred features, are highly suitable for use in the preparation of films. Preparation of the such films can take place in known manner, particularly by blow molding. The polymers of the invention are particularly suitable for, processing by sheet-blowing techniques. The copolymers may in this case be processed at a high peeling speed without showing tearing problems. Due to their excellent processibility, there can be produced, for a given set of conditions, films of lesser thickness than are possible to make using conventional copolymers of the same density and same MFI.

The following examples illustrate the invention:

EXAMPLES

Example 1

Preparation of a Supported Chromium Catalyst:

The support used was a granular $SiO_2$ support having a surface area (BET) of 320 $m^2/g$ and a pore volume of 1.75 mL/g. Such a support is available commercially from, for example, Grace under the trade name Sylopol 332.

To 100 kg of the support there were added 141 L of a solution of $Cr(NO_3)_3 \cdot 9H_2O$ in methanol (11.3 g/L), and after 1 hour the solvent was removed by distillation under reduced pressure.

The resulting intermediate contained 0.2 wt % of chromium.

The said intermediate product was calcined in a vapor-phase fluidized bed. The mixture was first of all heated to 300° C. with fluidization thereof by pure nitrogen, which was subsequently replaced by air, whereupon the mixture was heated until the desired end temperature of 700° C. had been reached. The mixture was kept at the end temperature over a period of 10 hours, after which the gas was switched back to nitrogen and the mixture cooled.

Example 2

Vapor-phase Polymerization

Polymerization was carried out in a fluidized bed reactor having a diameter of 0.5 m. The reaction temperature was from 110.4° to 112.5° C., the pressure in the reactor 21 bar. The reactor gas had the following composition: 56 vol % of ethylene, 0.23 vol % of 1-hexene, 2 vol % of hexane and 41.77 vol % of nitrogen. The catalyst used was the catalyst of Example 1.

Example 3

Preparation of Film

For comparison with conventionally manufactured copolymers, two commonly used commercial products were processed under identical conditions in parallel with a copolymer of the invention. The following table provides an overview of the properties of the polymers used:

TABLE 1

Properties of the copolymers

| Product | Density [kg/m³] | MFI | MFR |
|---|---|---|---|
| Polymer of Example 2 | 0.936 | 0.15 | 12.5 |
| Control product 1 | 0.939 | 0.17 | 19.0 |
| Control product 2 | 0.934 | 0.15 | 14.5 |

Film production took place in a film blowing machine as sold by Windmoeller and Hoelscher using the following settings: nozzle diameter 100 mm, die slot 1.2 mm, mass temperature 225° C., die pressure 390 bar, blow-up ratio 1:4, neck length 900 mm, film thickness 20 µm. The polymer throughput was 50 kg/hour.

The polymer of the invention showed absolutely no tears under the film-blowing conditions used, unlike the commercial control products. The process could be carried out at higher peeling speeds and thinner films could be produced. The following table shows the results of the film production:

TABLE 2

Comparison of extensibility and processability

| No. | Product | Blow-up ratio | Output [kg/h] | Peeling rate [m/min] | Film thickness [µm] | Result |
|---|---|---|---|---|---|---|
| 1 | * | 1:5 | 50 | 108 | 5 | no tearing |
| 2 | * | 1:5 | 30 | 108 | 3 | no tearing |
| 3 | * | 1:3 | 50 | 108 | 9 | no tearing |
| 4 | ** | 1:5 | 50 | 80 | 7 | tearing |
| 5 | ** | 1:3 | 50 | 90 | — | tearing due to pumping |
| 6 | *** | 1:5 | 50 | 75 | 7 | tearing |
| 7 | *** | 1:3 | 50 | 80 | — | tearing due to pumping |

*Polymer of Example 2
**Control product 1
***Control product 2

What is claimed is:

1. A continuous vapor-phase fluidized-bed process for the preparation of ethylene homopolymers and copolymers having a density of from 0.87 to 0.97 g/cm³ in which ethylene or mixtures of ethylene and $C_3$–$C_8$ α-monoolefins are (co)polymerized in the presence of a supported chromium catalyst prepared from chromium (VI) oxide, chromium salts, chromium (III) acetylacetonate, chromium hexacarbonyl, bis(cyclopentadienyl) chromium or bis (arene) chromium (0), which has been activated in an oxidizing atmosphere containing oxygen at a temperature of 400° to 1100° C., wherein the support is a porous oxide selected from the group consisting of $SiO_2$, $Al_2O_3$, MgO, $ZrO_2$, $Ba_2O_3$, CaO, ZnO and mixtures thereof, in the polymerization zone of a vapor-phase fluidized-bed reactor under pressures ranging from 1 to 100 bar and at temperatures ranging from 30° to 125° C. in the vapor phase in an agitated bed of bulk material comprising particulate polymer, the resultant heat of polymerization is removed by cooling the recirculated reactor gas and the resulting (co) polymer is removed from the vapor-phase fluidized-bed reactor, wherein, for the preparation of a (co)polymer of a specified density d, (co)polymerization is carried out at a temperature which is in a range restricted by an upper envelope defined by equation I $$T_H = 171 + \frac{6d'}{0.84 - d'} \quad (I)$$

and a lower envelope defined by equation II $$T_L = 173 + \frac{7.3d'}{0.837 - d'}, \quad (II)$$

in which the variables have the following meanings:
  $T_H$ is the highest reaction temperature in ° C.;
  $T_L$ is the lowest reaction temperature in ° C.;
  d' is the numerical value of the density d of the (co) polymer to be synthesized.

2. A process as defined in claim 1, wherein a supported chromium catalyst is used which has been activated at a temperature between 600° and 800° C.

3. A process as defined in claim 1, wherein a supported chromium catalyst is used which has an average pore volume of from 1.0 to 3.0 mL/g.

4. A process as defined in claim 1, wherein ethylene is copolymerized with 1-hexene.

5. The process of claim 2 wherein the catalyst activation temperature is from 650° to 750° C.

6. The process of claim 3, wherein the average pore volume is from 1.7 to 1.9 ml/g.

7. The process of claim 1, wherein the supported catalyst is prepared by
  1) contacting the support, in a solvent, with a chromium compound, removing the solvent and activating resulting mixture by
  2) first heating the mixture to from 200° to 400° C. with fluidization thereof by a pure inert gas,
  3) replacing the inert gas with air and heating at a temperature of 650° to 750° C. for 2 to 20 hours, and
  4) replacing the air with pure inert gas with cooling.

8. The process of claim 1 wherein the lower envelope of the temperature/density function is given by the equation $$T_L = 175 + \frac{7.3d'}{0.837 - d'} \quad (II')$$

9. The process of claim 1 wherein ethylene copolymers are prepared which have a density of from 0.930 to 0.945 g/cm³.

10. The process of claim 9, wherein the copolymers have a density of form 0.935 to 0.940 and the copolymerization is carried out in the range of between about 110° and 113° C.

11. The process of claim 10, wherein the copolymers have a melt flow rate of from 8 to 16 (measured by ISO 1133; 21.6/190° C.).

12. The process of claim 11, wherein the melt flow rate of the copolymers is from 10 to 14.

13. The process of claim 12, wherein films prepared from the copolymers by film blow molding can be processed at a high peeling speed without tearing.

14. The process of claim 13, wherein the comonomer is 1-hexene.

15. The process of claim 1 wherein the support is $SiO_2$ having a pore volume of from 1.7 to 1.9, a surface area (BET) of from 300 to 400 $M^2/g$;

wherein the supported catalyst is prepared by
1) contacting the support, in a solvent, with a chromium compound, removing the solvent and activating resulting mixture by
2) first heating the mixture to from 200° to 400° C. with fluidization thereof by a pure inert gas,
3) replacing the inert gas with air and heating at a temperature of 650° to 750° C. for 2 to 20 hours, and
4) replacing the air with pure inert gas with cooling;

wherein ethylene copolymers are prepared which have a density of from 0.935 to 0.940 and a melt flow rate of from 10 to 14 (measured by ISO 1133; 21.6/190° C.);

the copolymerization is carried out between about 110° and 113° C.;

and wherein films prepared from the copolymers by film blow molding can be processed at a high peeling speed without tearing.

16. The process of claim 15, the copolymer is ethylene-1-hexene.

* * * * *